United States Patent [19]

Hashimoto

[11] Patent Number: 4,866,755

[45] Date of Patent: Sep. 12, 1989

[54] MULTIPLE LANGUAGE TELEPHONE ANSWERING MACHINE

[75] Inventor: Kazuo Hashimoto, Tokyo, Japan

[73] Assignee: Hashimoto Corporation, Tokyo, Japan

[21] Appl. No.: 243,390

[22] Filed: Sep. 12, 1988

[30] Foreign Application Priority Data

Sep. 11, 1987 [JP] Japan ............................ 62-227729

[51] Int. Cl.⁴ .......................................... H04M 1/65
[52] U.S. Cl. ..................................... 379/80; 379/76
[58] Field of Search ............ 364/419, 200, 900, 513.5; 381/42–43, 51–53; 379/67, 68, 70, 73, 76, 77, 80, 88

[56] References Cited

U.S. PATENT DOCUMENTS 4,488,005  12/1984  Frantz ................................. 379/88
4,502,128   2/1985  Okajima et al. ..................... 364/419
4,507,750   3/1985  Frantz et al. ....................... 364/900

FOREIGN PATENT DOCUMENTS 60-119164  6/1985  Japan ................................. 379/94

Primary Examiner—Robert L. Richardson
Assistant Examiner—James E. Tomassini
Attorney, Agent, or Firm—Lowe, Price, LeBlanc, Becker & Shur

[57] ABSTRACT

In response to a first outgoing message from a telephone answering device in an original language, such as English, if a calling party from a country speaks in doubt or he cannot answer it quickly, his voice is analyzed to determine what language it is in order to send him a second outgoing message in his own language, or else a second outgoing message in the original language is sent out promptly to prevet the calling party from hanging up. The foreign calling party thus can understand the second outgoing message and leave his message on an incoming message tape. It is possible to use the present invention not only in a telephone answering device, but also in a general banking system or in question and answer telephone equipment.

4 Claims, 3 Drawing Sheets

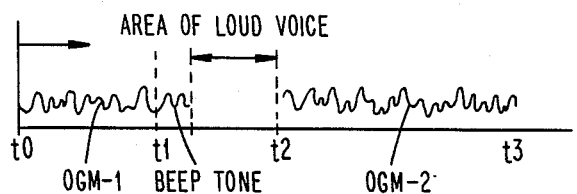
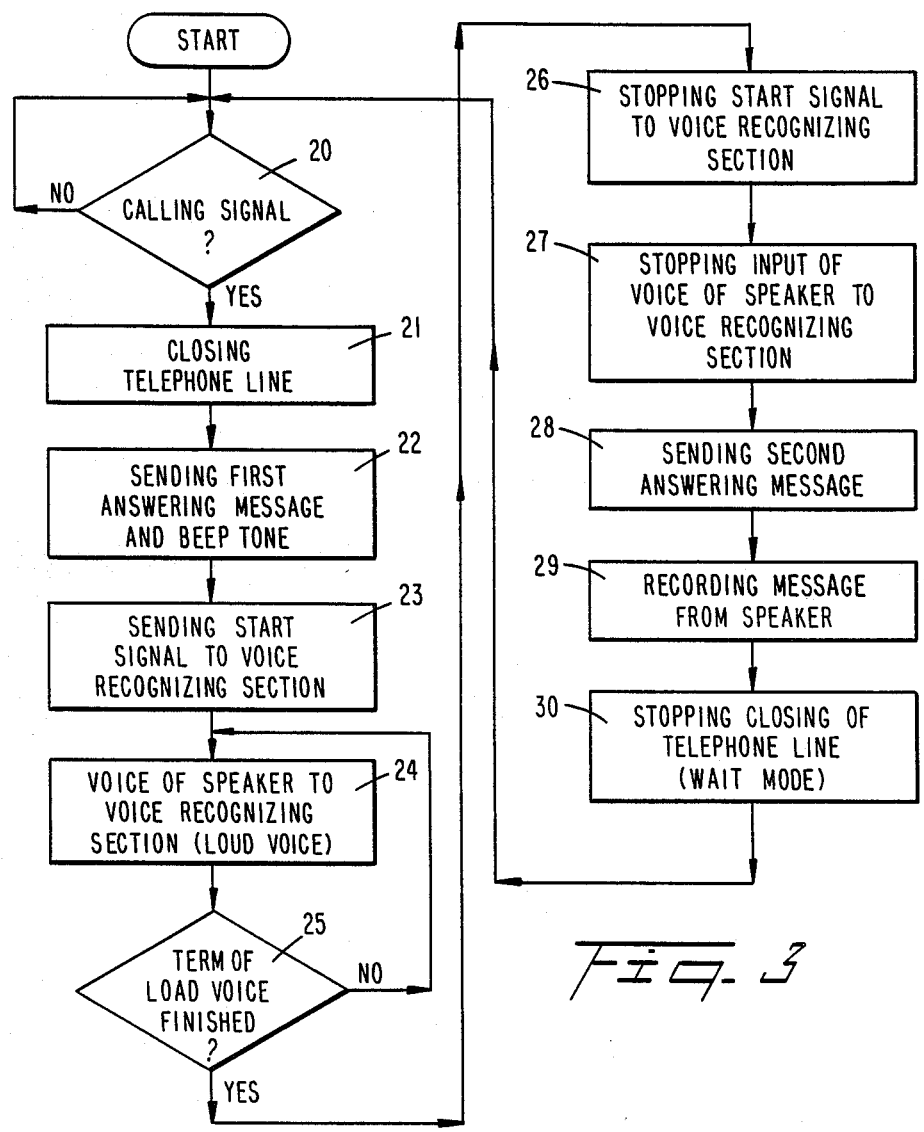

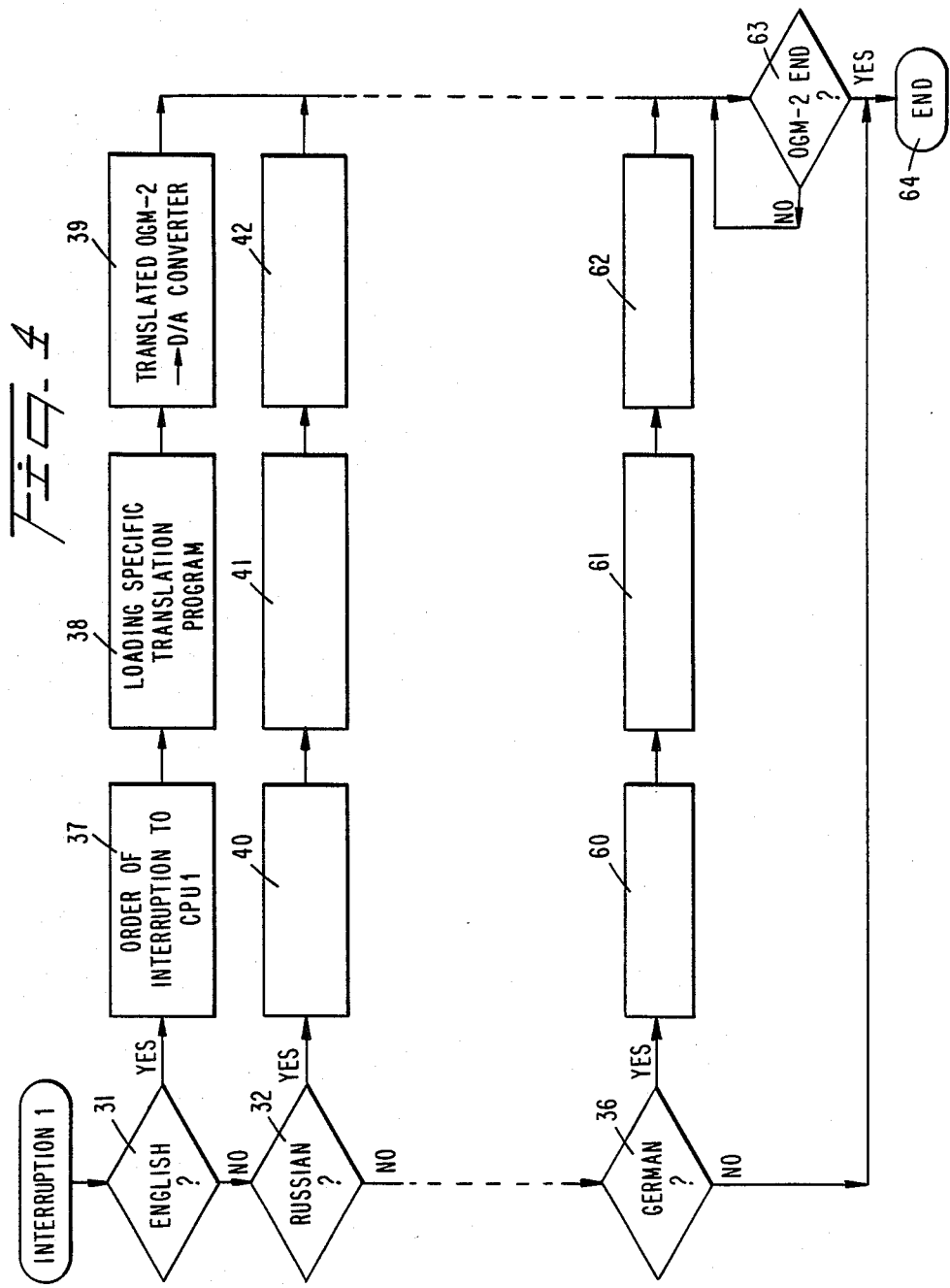

MULTIPLE LANGUAGE TELEPHONE ANSWERING MACHINE

BACKGROUND OF THE INVENTION

The present invention relates to a telephone answering device operable using several different languages.

In a conventional telephone answering device, outgoing messages are sent out in response to an incoming call to a caller. A beep tone is transmitted after said outgoing message and then an incoming message by the calling party is recorded if he leaves his message.

However, it is impossible to know previously from which country the incoming call is received and in which language the calling party speaks when the telephone answering device is operated. So, the conventional telephone answering device was not useful for the foreigner, because the foreign calling party cannot understand the outgoing message from the telephone answering device.

SUMMARY OF THE INVENTION

It is a first object of the present invention to provide a telephone answering device, wherein a prerecorded outgoing message in an original language, for instance, "This is Hashimoto Corporation. Who is speaking, please?" is sent out to a calling party, and wherein the calling party's voice in response to said first outgoing message is analyzed by a voice analyzer to decide which language it is when the calling party speaks in a foreign language, for instance, "Hello", Hallo", Allo", "ATTO" or Oligame", in order to send a most suitable second outgoing message in accordance with said calling party's language.

It is a second object of the present invention to provide a telephone answering device, wherein if the calling party responds in the same language, for instance in English to the English outgoing message "who is speaking, please?" as described in the first object, a next outgoing message in the original language can be immediately sent out to the calling party without the next step of analyzing the calling party's voice and deciding which language it is.

It is a third object of the present invention to provide a telephone answering device, wherein immediately after the calling party's voice in a foreign language, for instance, "Allo, allo"is spoken, "wait a minute", "just a moment" or the like is sent out to the calling party, in order to prevent the calling party from hanging up, so that the time required for the operation of the device for analyzing the calling party's voice or translating a next outgoing message can be delayed.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram which shows the recording conditions of the outgoing message on the tape;

FIG. 3 is a flow chart which shows the operation of the telephone answering device; and FIG. 4 is a flow chart which shows the operation at the time of automatic translating.

DESCRIPTION OF THE PREFERRED EMBODIMENT

Figure 1:
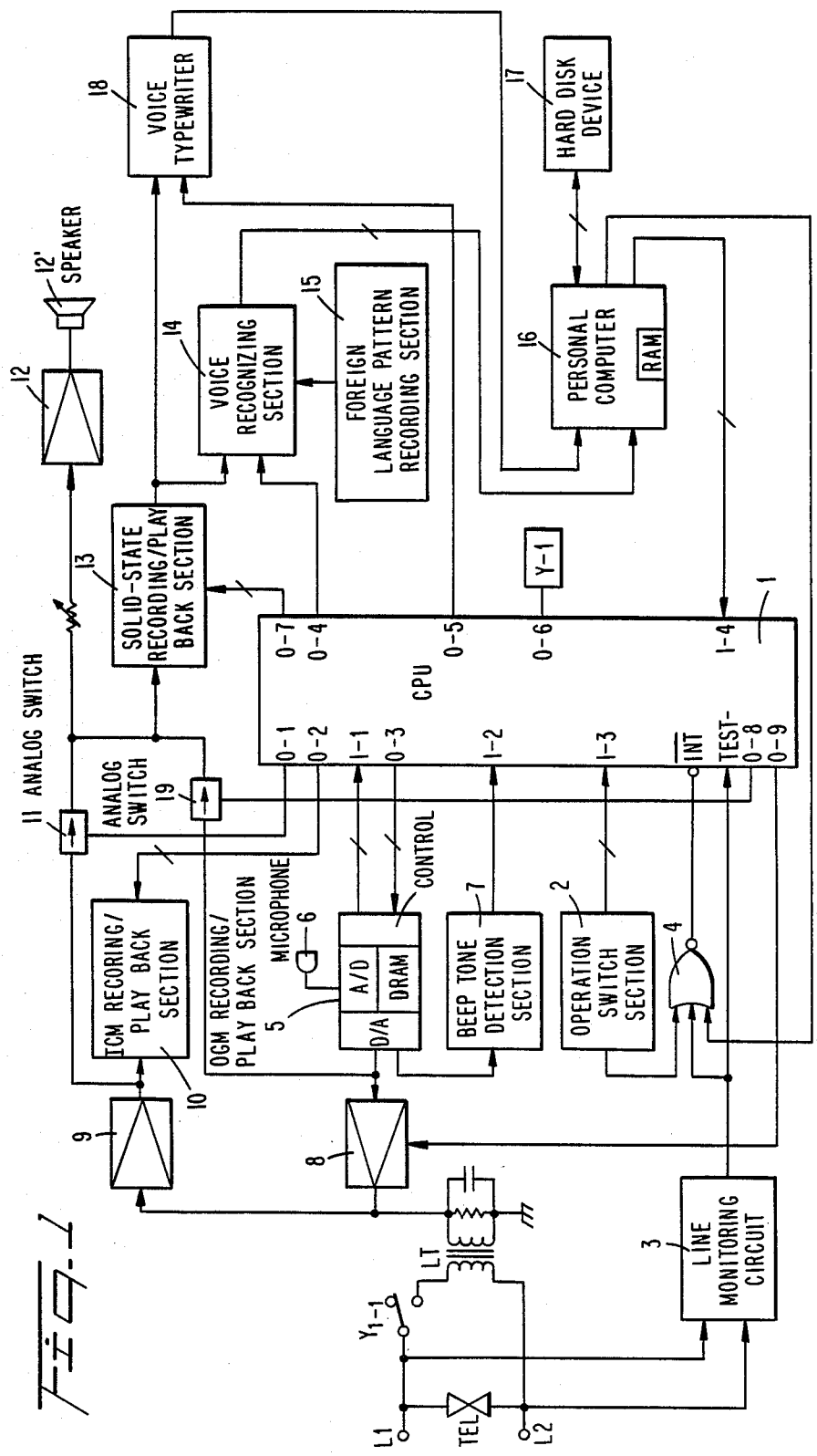
FIG. 1 is a block diagram which shows a principle of the present invention.

The arrangement and operation of the present invention will now be described with reference to the block diagram FIG. 1 and the flow charts FIGS. 3 and 4.

Referring to FIG. 1, reference symbols L1 and L2 denote telephone lines. Reference symbol Lt denotes a line transformer for connecting the telephone lines to the present device. Reference numeral 1 denotes a one chip microprocessor (hereinafter called as CPU) having a ROM (not shown) wherein the program is incorporated. Reference numeral 2 denotes an operation switch section including some keys, for instance, a recording key for recording an outgoing message (hereinafter called as OGM) and a beep tone on an OGM recording/playback section 5 described later, a playback key for playing back said OGM, and "AUTO" key for setting the device in an automatic answering/recording mode, and a key for playing back an incoming message (hereinafter called an ICM) from the calling party recorded on an ICM tape. The data showing which key is pushed is entered into an input port 1-3 of said CPU, and the signal showing that any key is being pushed are applied to an interrupt terminal INT of said CPU through a NOR gate described later.

Reference numeral 3 denotes line monitoring circuitry for detecting the ringing signal and the voltage change of telephone line when the calling party hangs up (on-hook). Reference numeral 4 denotes a NOR gate; 5 denotes a solid-state OGM recording/playback section comprising an LSI and memory DRAM; 6 denotes a microphone for recording the OGM; and 7 denotes a beep tone detecting section for detecting a beep tone reproduced from said OGM recording/playback section 5. When said beep tone is being detected, the calling party's voice is inputted and amplified, as described later. Reference numerals 8 and 9 denote amplifiers. Reference numeral 10 denotes an ICM recording/playback section for recording and playing back the ICM from the calling party. In the present embodiment, as a recording medium, a tape (ICM tape) is used, but as is needless to say, a disc, an IC chip or the like can be used.

Reference numeral 11 denotes an analog switch which is turned on while the calling party's voice is being inputted and amplified as described above; 12 denotes an amplifier; 12'denotes a loudspeaker and 13 denotes a solid-state recording/playback section comprising LSI and solid-state memory.

Reference numeral 14 denotes a voice recognizing section. While said calling party's voice is being inputted and amplified, said voice is introduced into the voice recognizing section. Then the voice recognizing section 14 compares said voice with foreign language words registered into a foreign language pattern registering section described later, and outputs the code for deciding which language said voice is. Reference numeral 15 denotes a foreign language pattern registering section, wherein main words that are supposed to be mostly spoken by the calling party when he accepts calling, for example, "Hello, this is" "Mr. — " in English, are pattern registered in some major foreign languages.

Reference numeral 16 denotes a personal computer and 17 denotes a hard disc device wherein the translation program for each language is stored.

Reference numeral 18 denotes a voice encoder for transforming a Japanese or other OGM voice that is to be translated into the character code for making input sentences for said translation program. Voice recognition and language translation circuitry are known in the prior art, such as in U.S. Pat. No. 4,507,750, incorporated herein by reference.

FIG. 2 shows schematically the recording conditions of the OGM and the beep tone recorded on said OGM recording/playback section 5. In FIG. 2, OGM-1 is a first OGM, for instance, "This is Hashimoto Corporation. Who is speaking, please?". The beep tone recorded between t1 and t2 (for a couple of seconds) is sent out to the calling party for about 0.5 second before said beep tone is detected. While said beep tone for the rest period that is continuously sent out is being detected by said beep tone detecting section, the calling party's voice is inputted into the device for voice recognition described later and is amplified to be heard by the people around the device so that the calling party may be identified.

Further, OGM-2, for example, "The person in charge is not here right now. Please leave your name, telephone number and message.—", is recorded.

Operations will now be described with reference to the flow charts, FIGS. 3 and 4.

When the ringing signal comes into the telephone lines L1 and L2 in FIG. 1, said ringing signal is detected by the line monitoring circuity 3, whose output is applied to an input terminal TEST-1 of the CPU 1. When it is determined to be a ringing signal in step 20 of the flow chart FIG. 3, a relay Y-1 is maintained energized by output of an output port 0-6 and the telephone line is engaged through a contact Y1-1 of the relay Y-1 (step 21).

In step 22, according to the command from an output port 00-3, the OGM-1 in FIG. 2 recorded on the OGM recording/playback section 5 is played back and sent out to the calling party through the amplifier 8 and the line transformer LT.

After sending out said OGM-1, the playback of the beep tone in FIG. 2 starts and the beep tone is detected by the beep tone detecting section. It takes about 0.5 second to detect it to be a beep tone. And after sending the beep tone for 0.5 second to the calling party (step 22), the bias voltage of the amplifier 8 is removed by output of an output port 0-9 to disable amplifier 8. Accordingly, the calling party can hear only said beep tone for 0.5 second, and not the beep tone that is continuously being activated.

In case of a Japanese calling party in Japanese, after he speaks his name in response to said OGM-1, his voice is amplified around the device through the line transformer LT, the amplifier 9, the analog switch 11 turned on by the command of an output port 0-1, the amplifier 12 and the loudspeaker 12' (steps 23 and 24). At this time, the person in charge can directly respond to the calling party through the telephone set TEL.

Now, said calling party's voice is simultaneously inputted to the voice recognizing section 14 from said analog switch 11 through the solid-state recording/-playback section 13. Said input is limited to the period of amplification when the beep tone of FIG. 2 is being played back, as shown in steps 25, 26 and 27. Accordingly, in the case of a Japanese calling party in Japan, his name is inputted into the voice recognizing section 14 responsive to OGM-1, and in case of another calling party in a different language, his voice spoken, for instance in English, "Hello, I am Mr. " or the like, is inputted into the voice recognizing section 14.

The voice inputted into said voice recognizing section 14 is ignored if it is, for instance, in Japanese which is not registered into the foreign language's pattern registering section 15 in Japan. The interrupt described later is not effected. The program proceeds from step 27 to step 28. The amplifier 8 is activated again and the OGM-2 in FIG. 2 is sent out to the calling party. As this step is done at high speed, said OGM-2 is sent out without giving any unnatural impression to the calling party.

After sending of said OGM-2, the ICM from the calling party is recorded on an ICM tape (not shown) of the ICM recording/playback section 10 through the line transformer LT and the amplifier 9. Then the telephone line is disengaged and the device returns to the standby mode (steps 29 and 30).

In the event that said voice inputted into the voice recognizing section 14 is in a foreign language other than Japanese and coincides with one of the registered patterns in the foreign language's pattern registering section 15, a predetermined code, for instance, a pattern registration number, is output. Said code is inputted into the personal computer 16, and in accordance with said code, the personal computer 16 decides what language the calling party's voice is (steps 31 to 36 in FIG. 4).

In case of the calling party's voice in English according to said recognition, an interrupt request is supplied to the CPU 1 from the personal computer 16 through the NOR gate 4 at step 37. Although not shown in the flow charts, the program in the CPU 1 applies the second Japanese OGM-2 recorded on the OGM recording/playback section to the voice typewriter 18 through the analog switch 19 and the solid-state recording/playback section 13, so that said Japanese OGM-2 is transformed into the character code and inputted in the personal computer 16.

While the CPU 1 operates as described above in response to the command by the personal computer 16, at step 38 the personal computer 16 makes the corresponding translation program loaded from the hard disk 17 to start the translation. As the OGM is in a relatively simple style and the translation program itself has a learning function, the translation is completed at a relatively high speed. The translated second OGM (digital signal) is applied to a D/A converter of the OGM recording/-playback section 5 through an input port I-4 and an output port O-3 of the CPU 1. Said second OGM is transformed into the analog signal OGM and then sent out to the calling party. If the translated OGM is output as a character code, it is transformed into the analog signal OGM by a voice synthesizing circuit not shown.

If the OGM is long and it takes much time to translate it, the time for sending out the OGM is stored to send out by voice synthesizing a message "a moment" which means "wait a minute" and most foreigners can understand, so that some time can be accrued in order to prevent the calling party from hanging on.

Further, it can be arranged to start translating into a predetermined foreign language, if the calling party sends a predetermined code as a tone (DTMF) of a push-button telephone to be recognized by the voice recognizing section 14 as audible frequency band in the same way as voice. And it can be also arranged to send out the second OGM in the original language if the calling party doesn't speak for more than a predetermined period of time, because the interruption is not activated and operation is as shown in the flow chart of FIG. 3 without the calling party's voice. In this case, the original language's second OGM is sent out at step 28.

After the translation is completed, the personal computer 16 stops operating, whereas in the CPU 1, after the translated second OGM is sent out, the ICM from the calling party is recorded as described above and then the device returns to the standby mode.

In the above description, each time the incoming call from the foreigner arrives, the second OGM is translated into the corresponding foreign language. However, complicated operation is always required. So, it may be also arranged to install a key for automatic translating on the operation switch section. In this case, when said key is pushed after Japanese OGM recording, the Japanese OGM is translated by the translation program into English, Russian, French, Spanish and German automatically. These translation data are stored in respective predetermined addresses of the memory RAM in the personal computer 16. When the incoming call from the foreigner arrives, the corresponding address of RAM is specified by voice recognition and the corresponding translated OGM is sent out.

The detailed operation will now be described.

It is assumed that the translation program for said every language is stored in the hard disc device 17. When said key for automatic translating is pushed, interrupt request is supplied to the CPU 1 through the NOR gate 4 and the interrupt terminal INT. According to the code applied to an input terminal I-3, the CPU 1 recognizes that said key for automatic translating is pushed. Then the program in the CPU 1 operates as follows.

A predetermined code is output from an output port 0-4 and inputted into the personal computer 16 through the voice recognizing section 14. Or, said predetermined code may be inputted into the personal computer 16 through another output port, for instance, 0-10 (not shown), without passing through the voice recognizing section 14. This code, for instance, corresponds to the pattern registration number which is registered into the foreign language's pattern registering section 15 described above. In order to begin with automatic translating into English, the code which corresponds to said pattern registration number for English is inputted into the personal computer 16. The second OGM is now translated into English in the same way as in the above case of the incoming call from the foreigner. The translated second OGM is stored into said memory RAM. After said translation is completed, the CPU 1 recognizes a translation completion signal from the personal computer 16 through the NOR gate 4. The next code for another foreign language to be translated next time, for instance, the code for Russian, is output from the output port O-4 to translate the second OGM into Russian and to store it into said memory RAM as described above.

Said operations may be repeated and it is possible to automatically translate according to the translation program for every foreign language which is stored in the hard disc device 17.

Further, as the second OGM translated into each foreign language is now in the form of digital signals, it can be saved in the hard disc device 17 as it is. And it is possible to load said second OGM into the personal computer 16 in each case of operations of the telephone answering device. Accordingly, in this case, it is possible to eliminate the operation in steps 38,41...61 for loading the translation program to translate, which requires much time, so that quick access is possible.

In a conventional telephone answering device, only the original language's OGM is recorded as custom. Even if the foreign language's OGM, for instance, the English OGM, is recorded after said original language's OGM, every calling party has to listen to the English OGM reproduced after the original language's OGM and it is a waste of time and causes inconvenience for the calling party who does not need the English OGM. However, according to the present invention, it is possible to recognize the calling party's voice in foreign languages, for instance, "Hello", "Allo" or the like in response to the first OGM in original language, for instance, "Who is speaking, Please?", to select the foreign language's OGM that is most suitable for said calling party and to sent it to him. Therefore, the present invention is very advantageous in practical use, in view of the future when the telephone answering device will make continuous progress together with the telephone set and the world-wide automatic direct dialing will be possible.

Although a certain preferred embodiment has been shown and described, it should be understood that many changes are modifications may be made therein without departing from the scope of the invention. For instance, it can be used for not only a telephone answering device but also a telephone banking system or an answer and question telephone equipment, etc.

What is claimed is:

1. A telephone answering device for answering an incoming telephone call and afterwards recording a calling party's voice, comprising:
   means for sending out at least an outgoing message such as "Who is speaking, please";
   means for amplifying or recording the calling party's voice in response to said outgoing message;
   means for voice analyzing said calling party's voice and deciding which language the calling party speaks;
   means for selecting a most suitable foreign language for the calling party in response to said analyzing means; and
   means for sending out the outgoing message from the device in said most suitable foreign language.

2. A telephone answering device, according to claim 1, wherein a plurality of said outgoing messages are predetermined and pre-translated in every language to be selected in the device.

3. A telephone answering device, according to claim 1, wherein an outgoing message in an original language, for example, Japanese, is translated into the selected language by a built-in translation device in the telephone answering device each time the calling party's voice is analyzed, to send out said translated outgoing message.

4. In a telephone answering device for automatically answering an incoming call and recording a calling party's voice, a method comprising the steps of:

sending out at least a first outgoing message such as "Who is speaking, please?" upon reception of incoming call from the calling party;
voice analyzing the calling party's voice in response to said first outgoing message;
selecting a most suitable foreign language from a store of outgoing messages for the calling party; and
sending out the outgoing message in said most suitable foreign language to the caller.

* * * * *